No. 658,076. Patented Sept. 18, 1900.
G. W. SWIFT, Jr.
MACHINE FOR MAKING TAGS.
(Application filed Aug. 13, 1898.)

(No Model.) 8 Sheets—Sheet 2.

WITNESSES:
E. L. Fullerton.
Frank C. Mosley

INVENTOR:
GEORGE W. SWIFT JR.,
By Arthur E. Paige,
Atty.

THE NORRIS PETERS CO., PHOTO-LITHO., WASHINGTON, D. C.

No. 658,076. Patented Sept. 18, 1900.
G. W. SWIFT, Jr.
MACHINE FOR MAKING TAGS.
(Application filed Aug. 13, 1898.)

(No Model.) 8 Sheets—Sheet 4.

WITNESSES:
E. L. Fullerton
Frank C. Morley

INVENTOR:
GEORGE W. SWIFT JR.,
By Arthur E. Paige
Atty.

No. 658,076. Patented Sept. 18, 1900.
G. W. SWIFT, Jr.
MACHINE FOR MAKING TAGS.
(Application filed Aug. 13, 1898.)

(No Model.) 8 Sheets—Sheet 5.

WITNESSES:
E. L. Fullerton
Frank C. Morley

INVENTOR:
GEORGE W. SWIFT JR.,
By Arthur E. Paige
Atty.

No. 658,076. Patented Sept. 18, 1900.
G. W. SWIFT, Jr.
MACHINE FOR MAKING TAGS.
(Application filed Aug. 13, 1898.)
(No Model.) 8 Sheets—Sheet 6.
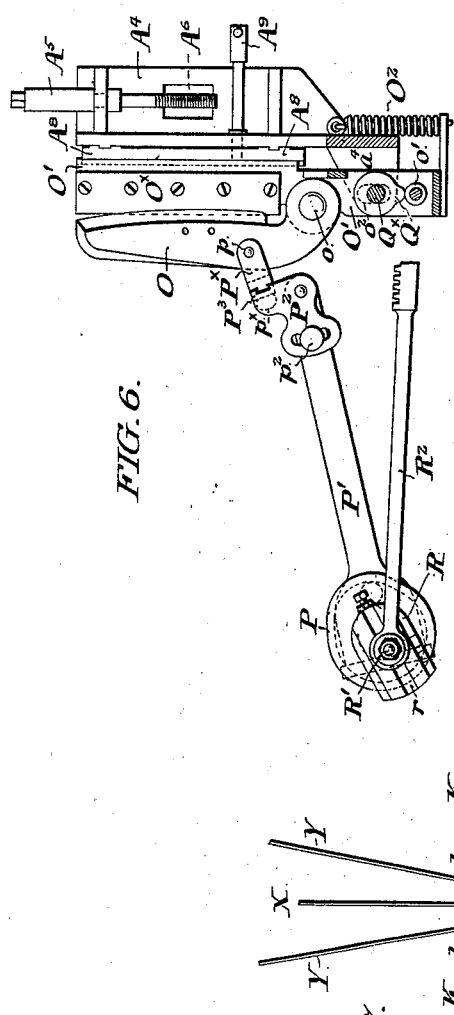
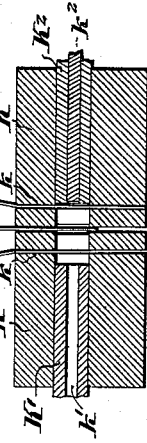
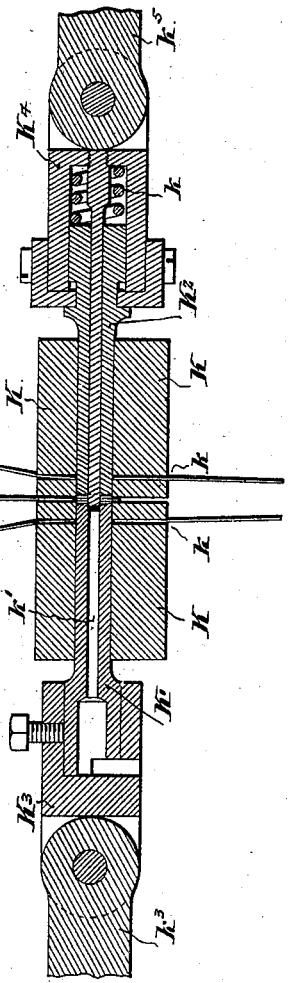
WITNESSES:
E. L. Fullerton
Frank C. Morley
INVENTOR:
GEORGE W. SWIFT JR.,
By Arthur E. Paige
Atty.

No. 658,076. Patented Sept. 18, 1900.
G. W. SWIFT, Jr.
MACHINE FOR MAKING TAGS.
(Application filed Aug. 13, 1898.)

(No Model.) 8 Sheets—Sheet 7.

WITNESSES:
E. L. Fullerton
Frank C. Morley

INVENTOR:
GEORGE W. SWIFT JR.,
By Arthur E. Paige,
Atty.

THE NORRIS PETERS CO., PHOTO-LITHO., WASHINGTON, D. C.

No. 658,076. Patented Sept. 18, 1900.
G. W. SWIFT, Jr.
MACHINE FOR MAKING TAGS.
(Application filed Aug. 13, 1898.)

(No Model.) 8 Sheets—Sheet 8.

WITNESSES:
E. L. Fullerton
Frank C. Morley

INVENTOR:
GEORGE W. SWIFT JR.,
By Arthur E. Paige,
Atty.

United States Patent Office.

GEORGE W. SWIFT, JR., OF BORDENTOWN, NEW JERSEY, ASSIGNOR TO THE DENNISON MANUFACTURING COMPANY, OF BOSTON, MASSACHUSETTS.

MACHINE FOR MAKING TAGS.

SPECIFICATION forming part of Letters Patent No. 658,076, dated September 18, 1900.

Application filed August 13, 1898. Serial No. 688,466. (No model.)

*To all whom it may concern:*

Be it known that I, GEORGE W. SWIFT, Jr., of Bordentown, New Jersey, have invented a certain new and useful Improvement in Mechanism for Making Tags, whereof the following is a specification, reference being had to the accompanying drawings.

My invention comprises mechanism which, combined as hereinafter described and claimed, is adapted to form tags of paper, cardboard, coated textile fabric, or similar material, which tags are reinforced, perforated at the reinforced portion to receive an attaching cord or wire, and provided with any desired imprint at a single operation.

My invention also comprehends certain details of construction hereinafter more definitely specified.

In the accompanying drawings I have shown a machine conveniently embodying the essential mechanisms to make and imprint tags as above set forth.

Figure 1:
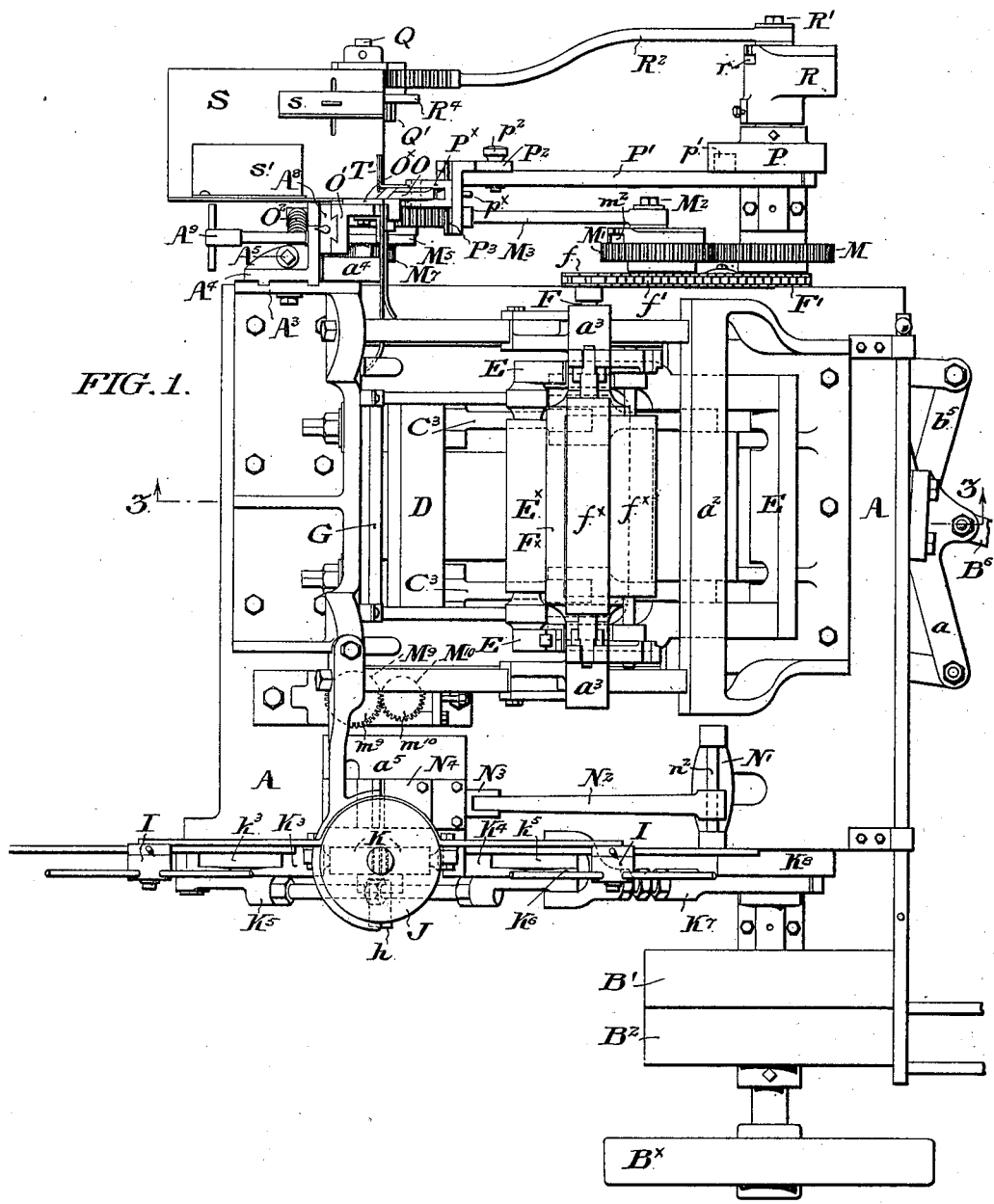
Figure 2:
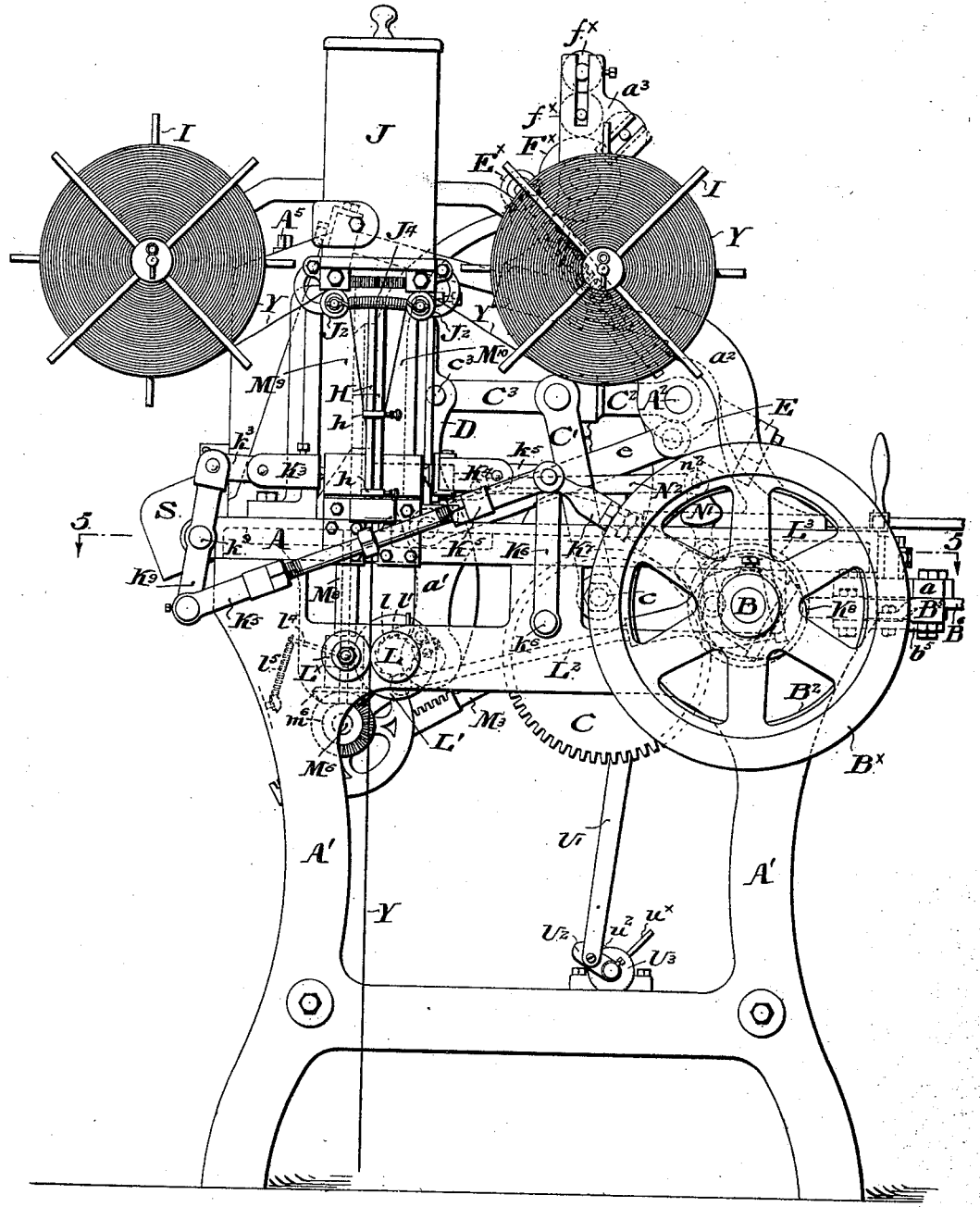
Figure 3:
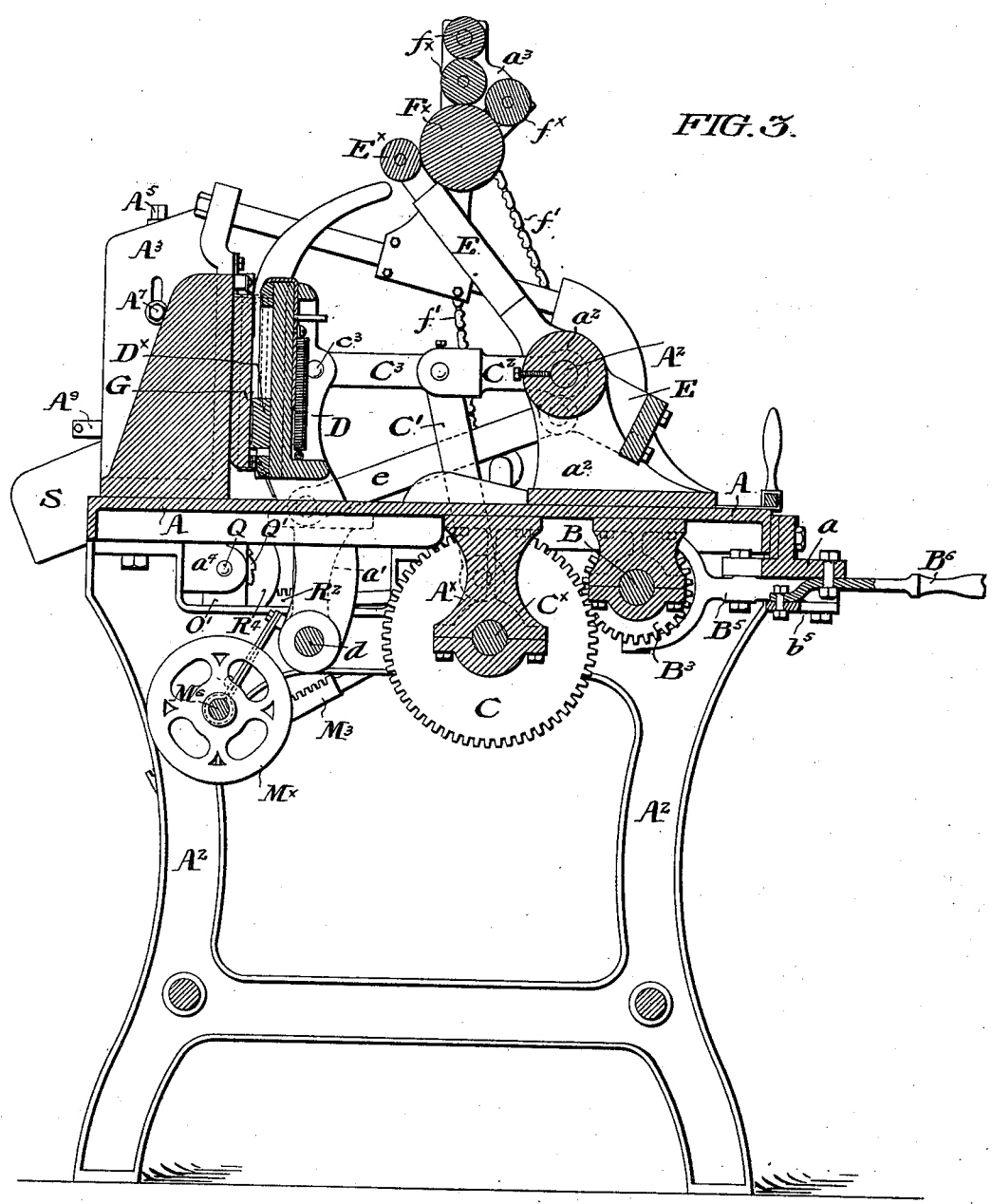
Figure 4:
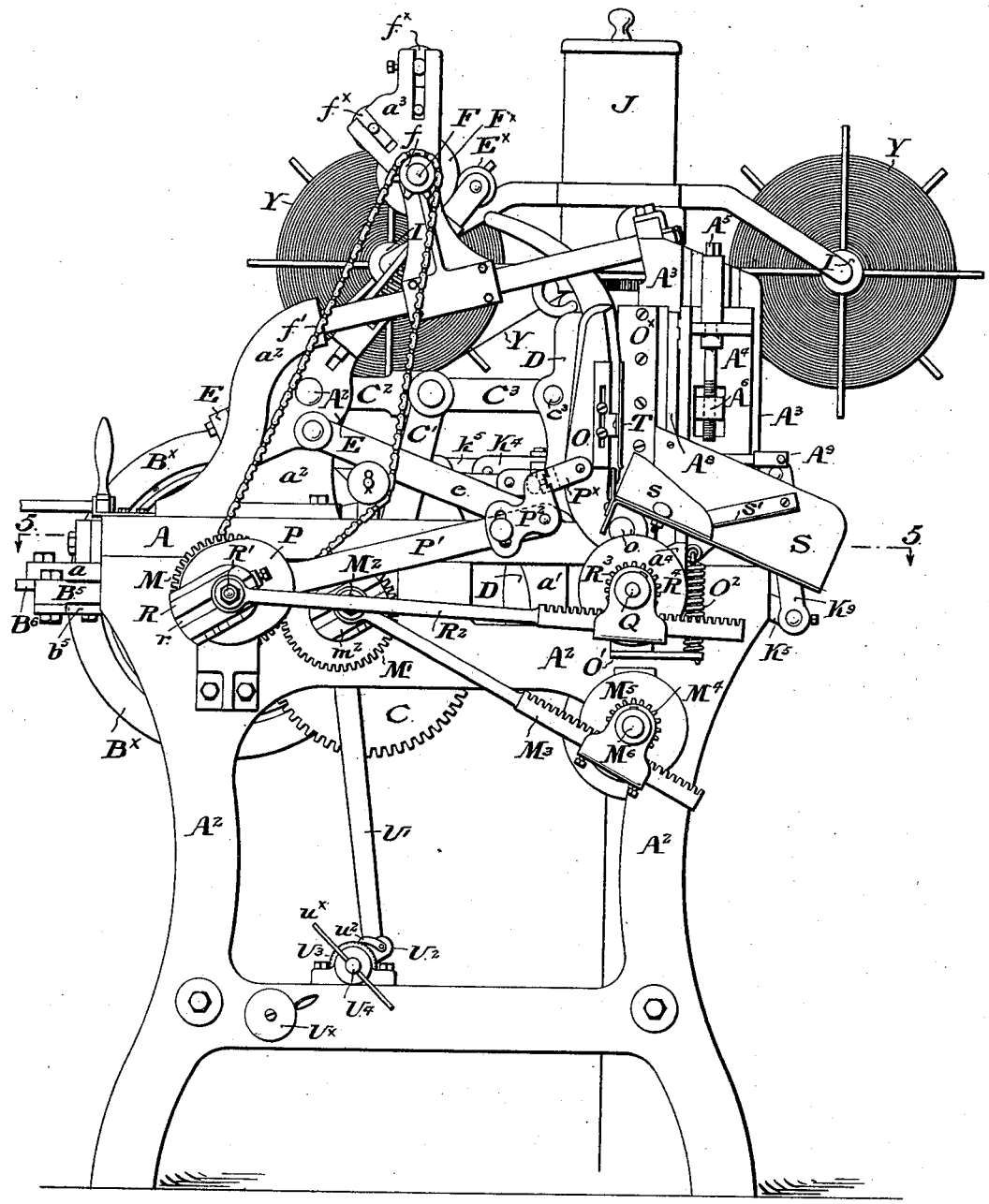
Figure 5:
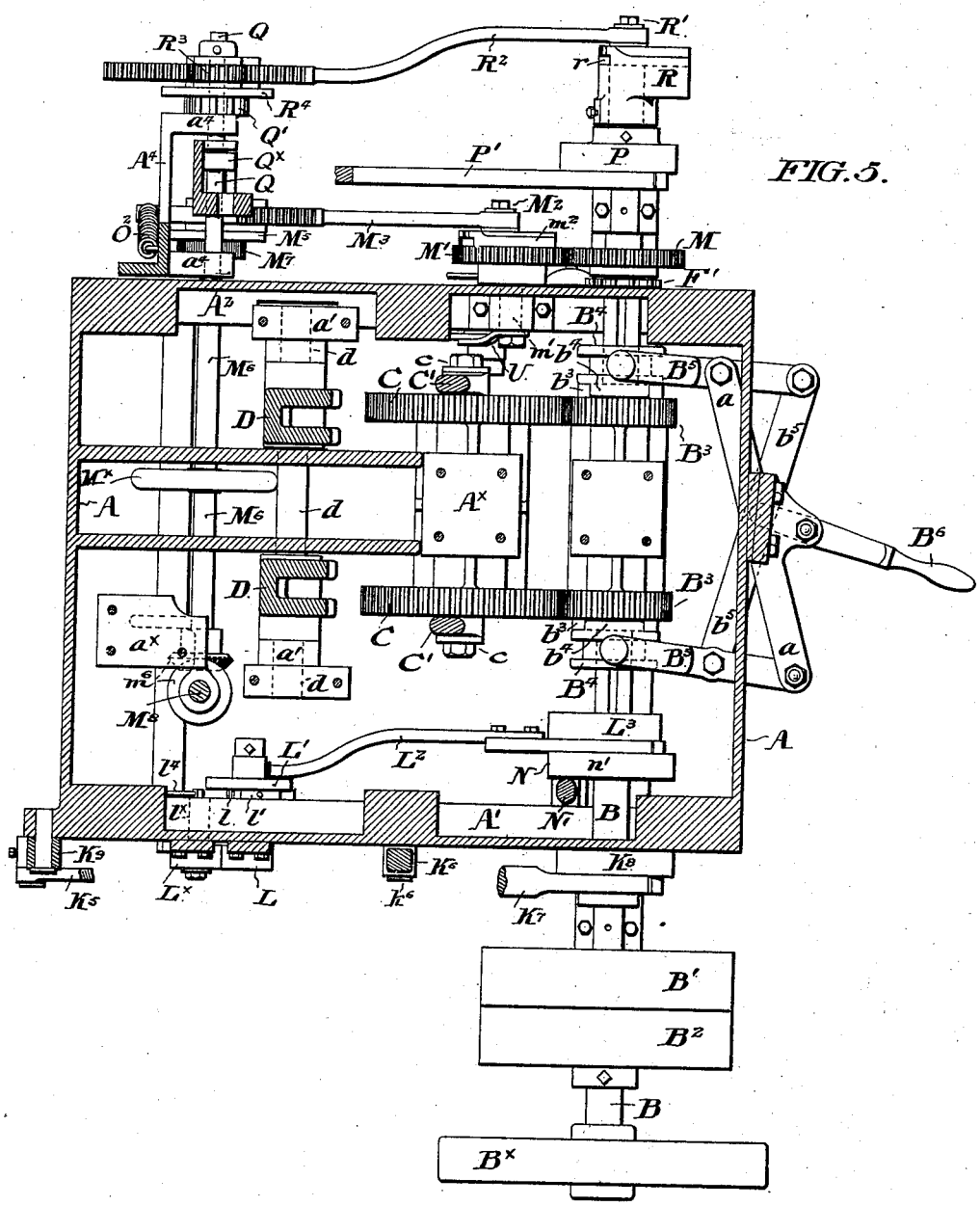
Figure 9:
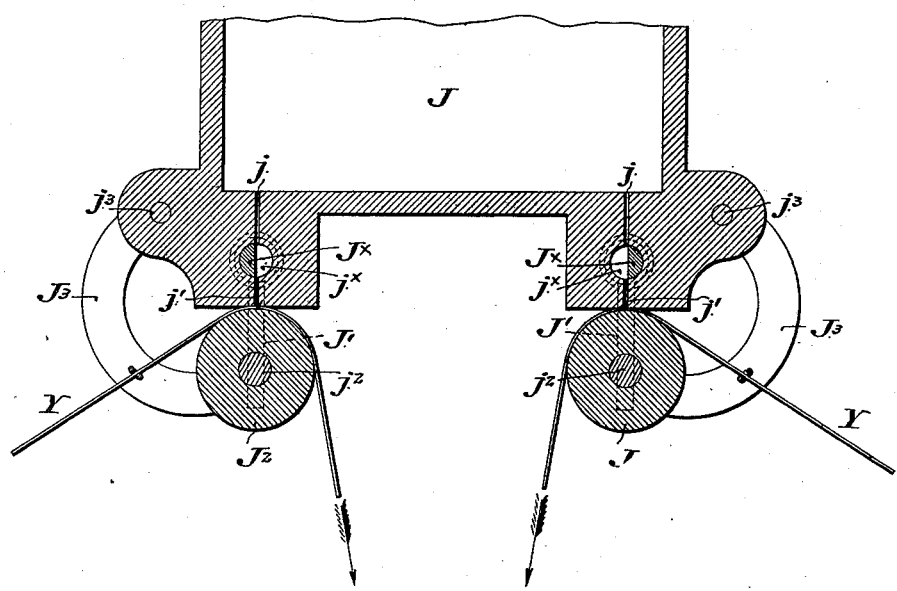
Figure 10:
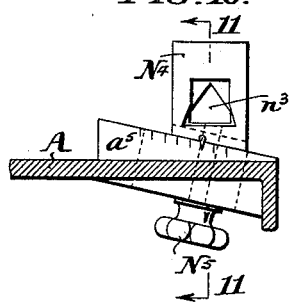
Figure 11:
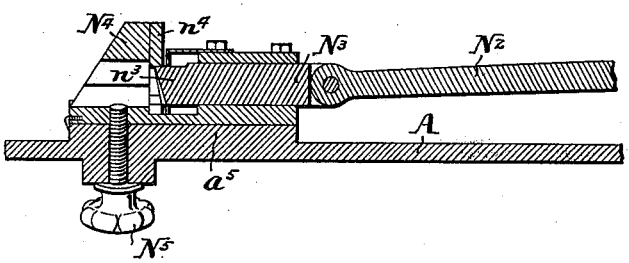
Figure 12:
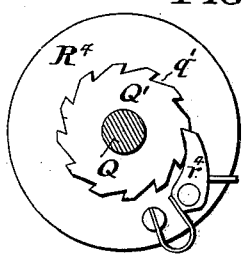
Figure 13:
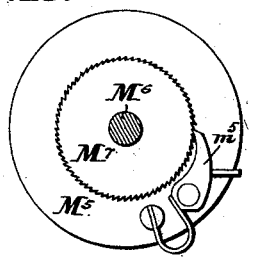
Figure 14:
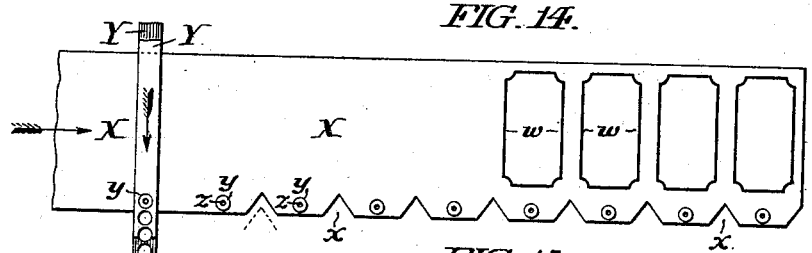
Figure 15:
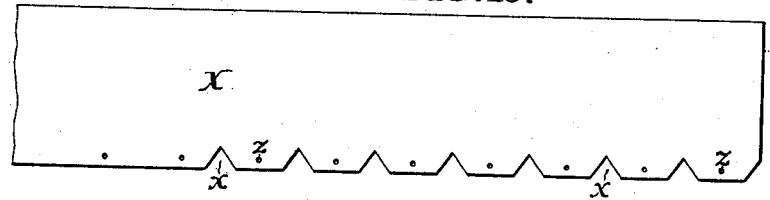
Figure 16:
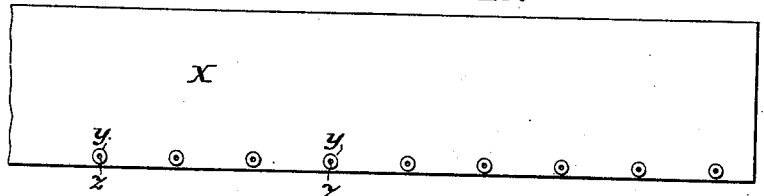
Figure 17:
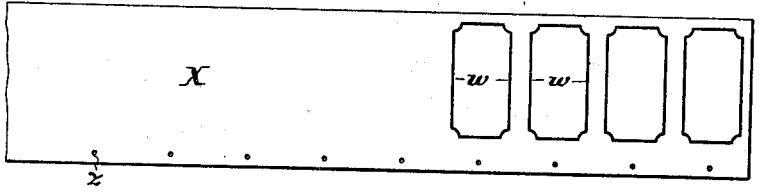
Figure 18:
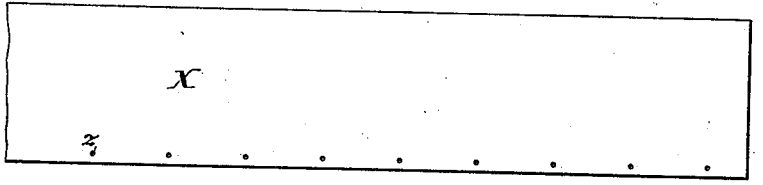
Figure 19:
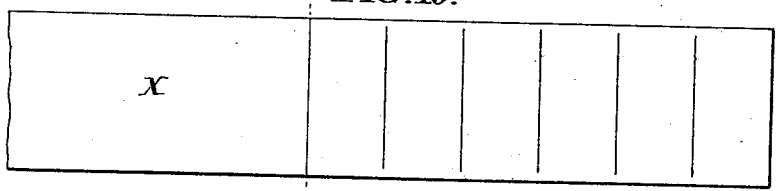

In said drawings, Figure 1 is a plan view of said machine. Fig. 2 is an elevation of the front end of the machine, being the end shown at the lower part of Fig. 1. Fig. 3 is a sectional view taken on the line 3 3 of Fig. 1 in the direction of the arrows upon said line. Fig. 4 is an elevation of the rear end of the machine opposite to that shown in Fig. 2. Fig. 5 is a plan sectional view taken on the line 5 5 of Figs. 2 and 4. Fig. 6 is a fragmentary end elevation similar to Fig. 4, showing a different adjustment of the knife mechanism. Figs. 7 and 8 are vertical sectional views taken centrally through the perforating-dies, showing the detailed construction thereof. Fig. 9 is a vertical sectional view taken centrally through the reservoir for adhesive liquid and showing the detailed construction of the outlet-valves thereof. Fig. 10 is a fragmentary end elevation of the notching-dies. Fig. 11 is a sectional view taken on the line 11 11 of Fig. 10 in the direction of the arrows upon said line. Fig. 12 is a detail view of the ratchet forming part of the shear-shifting mechanism operative in the formation of tag gangs. Fig. 13 is a detail view of the ratchet forming part of the feeding mechanism for the tag-body web. Figs. 14 to 19, inclusive, show different products produced by varying the adjustments of the machine, said figures illustrating somewhat diagrammatically the steps in the manufacture, beginning at the left-hand side of the figures and showing the severed complete products at the right-hand side thereof. Fig. 14 shows the most elaborate product of the machine, being a tag having a portion reinforced and said reinforced portion perforated, the corners of the tag-body adjoining said perforations being removed and the tag provided with an imprint. Fig. 15 shows a tag formed of the same outline as that of Fig. 14, but not reinforced or imprinted. Fig. 16 shows a tag in which the corners remain rectangular, the tag-body being reinforced and perforated, as aforesaid, but not imprinted. Fig. 17 shows a tag in which the corners remain rectangular, the tag-body being perforated and imprinted, but not reinforced. Fig. 18 shows a tag in which the corners remain rectangular, the tag-body being perforated, but not reinforced or imprinted. Fig. 19 shows what is known to the trade as a "gang" of tags, six tags being shown as connected in series solely at their top and bottom edges by a narrow uncut portion of the tag-body web.

In said drawings, A is the main frame or table, supported upon suitable standards $A'$ and $A^2$.

B is the main driving-shaft, provided with the usual tight and loose pulleys $B'$ and $B^2$, and $B^\times$ is a hand-wheel mounted upon the extremity of the shaft B.

$B^3$ $B^3$ are duplicate gears loosely mounted upon said shaft B and provided with clutch-faces $b^3$ $b^3$.

$B^4$ $B^4$ are duplicate clutch-sleeves suitably keyed upon the shaft B and provided with clutch-faces $b^4$ $b^4$, opposed to the respective clutch-faces $b^3$ upon the gears $B^3$. Said clutches are engaged and disengaged by means of levers $B^5$, fulcrumed upon the frame member $a$ and connected by the link $b^5$ with the hand-lever $B^6$.

The gears $B^3$ $B^3$ are respectively engaged with duplicate gears C C, fixed upon the shaft $C^\times$, mounted for rotation in the frame member $A^\times$. (See Fig. 3.) Said gears C are provided with eccentric wrist-pins $c$ $c$, and the latter are connected by pitmen $C'$ $C'$ with toggle-levers $C^2$ $C^3$. Said levers $C^2$ are mounted for oscillation upon the stud-shaft $A^2$, which is fixed in the frame member $a^2$, and the levers $C^3$ are pivotally connected at $c^3$ with the chase D, the lower shaft member $d$ of which is mounted for oscillation within the depending frame members $a'$. Said chase D is connected by links $e$ $e$ with the oscillatory frame E, loosely mounted upon the shaft $A^2$ and provided at its outer extremity with a spring-journaled inking-roller $E^\times$, the relation of the parts being such that the roller $E^\times$ traverses the face of the type $D^\times$, mounted in the chase D, during the backward stroke of the latter, and during the forward stroke of the chase the roller $E^\times$ is presented against the inking-roller $F^\times$. As shown in Figs. 1, 3, and 4, said roller $F^\times$ is mounted in bearings $a^3$ upon the frame A, provided with the usual ink-distributing rollers $f^\times$ and rotated by the gear-wheel $f$, which is fixed upon the extremity of the roller-shaft F and connected by the chain $f'$ with the driving-gear $F'$ upon the shaft B. The platen G, opposed to the chase D, supports the tag-web X as it is progressed across said platen with a step-by-step movement and operated upon by the various tag-forming elements of the machine.

The coöperation of the various elements of the machine may be better understood by preliminary examination of Fig. 14, which illustrates somewhat diagrammatically the various steps in the manufacture of the most elaborate product of the machine illustrated. At the left of said figure is shown the blank web X, which is progressed in the direction of the arrow between the reinforcing-strips Y, which are progressed step by step in the direction of the arrow marked upon them. Said strips Y are coated with adhesive on their respective faces adjacent to the web X, and disk portions $y$ are punched from the strips Y, compressed against said web, and, together with the latter, are perforated, as indicated at $z$. The perforations $z$ serve to receive attaching cord or wire, and said disks $y$ serve to reinforce the perforated body of the tag. The corners of the tag adjoining the perforation $z$ are shaped as shown at the right-hand side of said figure, and this is conveniently effected by notching the lower edge of the web X, as indicated at $x$.

The machine is adapted to receive webs X of differing widths, the width of said web representing the length of the tags which are formed therefrom, and in order that the width of the various sizes of tags may be made in proportion to the lengths thereof I have fixed the perforating mechanism in position upon the frame A and provided means to predetermine and adjust the extent of feeding traverse of said web X during the intervals of operation of said mechanism. In order that the notches at the lower edge of said web may be made in correspondence with the variation in feeding traverse of said web, I have provided means to adjust the position of the notching mechanism toward and from said perforating mechanism and have also provided means to adjust the notching-die vertically with respect to the lower edge of said web to vary the dimensions of the notches therein. The types or blocks mounted in said chase D to imprint upon the tag-body web X are of course adjusted horizontally and vertically to proper relation with the particular width of tag-body imprinted, so that the respective tag-imprints $w$ shall be centrally located in line with the respective tag-perforations $z$, as indicated in Fig. 14.

Referring now to Fig. 2, H H are guide-rods between which the tag-body web X is fed to the machine, and said rods are conveniently provided with vertically-adjustable guide-plates $h$, which maintain said web in proper relation to the tag-forming elements of the machine, of which I shall first describe the reinforcing and perforating mechanism. The reinforcing-strips Y Y are placed in rolls upon reels I I upon opposite sides of the reservoir J, which contains a supply of adhesive liquid with which the strips Y are coated upon their respective surfaces subsequently presented next to the web X. The coating operation is conveniently effected as follows:

Referring to Figs. 2 and 9, $j$ $j$ are ports in the bottom of the reservoir J, the mouths $j'$ of said ports being narrow slots of length somewhat less than the width of the strips Y. Each of said ports $j$ is provided with a stop-valve $J^\times$, cut away in registry with the respective ports, as indicated at $j^\times$. The valve-bodies are conveniently cuniform and are rotated by the handles $J^7$ to open or close the ports $j'$. Opposed to the respective port-mouths $j'$ are rollers $J^2$, mounted for rotation upon studs $j^2$, projecting from arms $J^3$, swung from centers $j^3$ upon the reservoir J. The spring $J^4$, connecting the studs $j^2$, serves to maintain the rollers $J^2$ against the port-mouths $j'$. The respective strips Y extend from the reels I between the rollers $J^2$ and the respective mouths $j'$, to which said rollers are opposed. It is obvious that when the valves $J^\times$ are open, as shown in Fig. 9, the liquid adhesive in the reservoir J gravitates through the ports $j$ and is spread upon the strips Y, upheld by the rollers $J^2$, the strips being evenly and continuously coated with the adhesive as they pass over said rollers $J^2$.

Referring to Figs. 2, 7, and 8, K K are die-blocks having ducts $k$ $k$, through which the strips Y Y extend. The tag-web X extends horizontally between the die-blocks K K and the strips Y Y, the normal position of the parts being that shown in Fig. 7, wherein the die-plungers K' $K^2$ are withdrawn from the path of travel of the strips Y. The plungers K' $K^2$ reciprocate from the position shown in Fig. 7 to that shown in Fig. 8, and in their travel punch disk portions $y$ from the respective webs Y Y, compress said portions upon the web X, and perforate the latter, as shown at $z$ in Fig. 14. The plunger-head $K^4$ is connected by the link $k^5$ with the lever $K^6$, fulcrumed at $k^6$ upon the frame-standard $A'$ and connected by the pitman $K^7$ with the cam $K^8$, fixed upon the shaft B. The link $K^5$, which is also connected at the top of the lever $K^6$, extends to the lower end of the lever $K^9$, which is fulcrumed at $k^9$ upon the frame A and is connected at its upper extremity with the plunger-head $K^3$ by the link $k^3$, so that the cam $K^8$ serves to oppositely reciprocate both of the plungers $K'$ and $K^2$. It will be noticed that a double punching operation is effected by the single reciprocation of the plungers $K'$ and $K^2$. The plunger $K^2$ being loosely mounted for reciprocation in the plunger-head $K^4$ is thrust outwardly therefrom by the spring $k^4$ and normally assumes the position shown in Fig. 7 with respect to the central plunger-stem $k^2$. Said stem registers with the passage-way $k'$ in the plunger $K'$, forming, with the latter, a secondary set of punching-dies. The plunger $K^4$ having a longer stroke of reciprocation than the plunger-head $K^3$, the excess of movement of the former is sufficient to carry the die-stem $k^2$ through the tag-web X and the reinforcing-pieces $y\ y$, forming the perforation $z$ therein, as shown in Fig. 8, the plunger-head $K^4$ and stem $k^2$ shifting with respect to the plunger $K^2$ during the latter portion of its stroke. The strips Y Y are drawn from the reels I I over the rollers $J^2$ and through the die-blocks K by the feed-rollers $L\ L^\times$. The roller L is provided with a ratchet $l$, engaged by the pawl $l'$ upon the pawl-disk $L'$, which is connected by the pitman $L^2$ with the cam $L^3$ upon the shaft B. (See Figs. 2 and 5.) Said cam $L^3$ serves to reciprocate the pitman $L^2$ and partly rotate the roller L at each revolution of the shaft B, so that the strips Y are shifted step by step to be punched throughout, as indicated in Fig. 14. The roller $L^\times$, opposed to the roller L, is mounted eccentrically upon the short shaft $l^\times$, journaled in the standard $A'$ and provided at its inner extremity with a lever $l^4$, connected by the spring $l^5$ with said standard, the parts being so related that said spring tends to shift the center of rotation of the roller $L^\times$ toward the roller L to firmly grip the strips Y Y fed between said rollers. The web X is intermittently progressed by the feed-rollers $M^9\ M^{10}$ an amount predetermined and adjusted in accordance with the dimensions of the tags to be produced as follows:

Referring to Figs. 1, 4, 5, and 13, M is a gear-wheel fixed upon the shaft B and engaged with the gear-wheel $M'$, fixed upon the shaft $m'$, journaled in the standard $A^2$. $M^2$ is an eccentric-stud radially adjustable in the slideway $m^2$, fixed upon the gear $M'$. The rack-pitman $M^3$ is journaled at one extremity upon said stud $M^2$ and is yoked at the other extremity for engagement with the gear-wheel $M^4$, fixed upon the pawl-disk $M^5$. Said yoke and disk are loosely mounted upon the shaft $M^6$, and the pawl $m^5$ upon the pawl-disk $M^5$ engages with the ratchet-wheel $M^7$, fixed upon the shaft $M^6$. Said shaft is mounted for rotation in the standard $A^2$ and in the frame member $a^\times$, is provided with the hand-wheel $M^\times$, and connected by the miter-gears $m^6$ with the shaft $M^8$, upon which is fixed the web-feeding roller $M^9$. Said roller $M^9$ is opposed by the pressure-roller $M^{10}$, mounted in the usual spring-bearings, and said rollers are connected at their upper extremities by respective gears $m^9$ and $m^{10}$. The slideway $m^2$ is conveniently graduated to represent fractions of an inch of circumference of the feed-roller $M^9$, so that the eccentric-stud $M^2$ may be directly adjusted in accordance with the size of the tags to be produced to rotate the roller $M^9$ the extent of one tag width at each stroke.

The mechanism for forming the notches $x$ (shown in Fig. 14) is conveniently located in the line of travel of the web X, between the die-blocks K K and the feed-rollers $M^9\ M^{10}$, and is constructed as follows: Referring to Figs. 1, 2, 5, 10, and 11, N is a cam fixed upon the shaft B, engaging with the roller $n'$ upon the lower extremity of a lever $N'$, mounted for oscillation in the frame A. The upper extremity of said lever $N'$ comprises a shaft $n^2$, upon which is journaled a link $N^2$, serving to actuate the notching-plunger $N^3$, mounted for reciprocation in the die-block $N^4$. The forward extremity of said plunger $N^3$ is shaped in conformity with the notches $x$ (shown in Fig. 14) and registers with a similarly-shaped die-plate $n^4$. As the notches $x$ are centrally located between the perforations in the tag-body web, it follows that the notching-plunger must be shifted horizontally away from the perforating mechanism in accordance with the increase of width of the tags manufactured. The notches $x$ also vary in dimensions in proportion to the size of tags produced. I have therefore found it convenient to mount the die-block $N^4$ upon an inclined slide-bearing $a^5$ upon the frame A, to which it is secured by the screw-clamp $N^5$. The angle of inclination of said slide-bearing is such that when the die-block $N^4$ is shifted horizontally from one graduation to another (representing the standard sizes of tags) the die-block is also raised or lowered in accordance therewith to proportionately vary the dimensions of the notches produced in the edge of the web X, the long pivotal connection for the link $N^2$ at the top of the lever $N'$ permitting such adjustment.

After passing in its feeding traverse the reinforcing, perforating, notching, and printing mechanisms above described the tag-body web X may be sheared to form disconnected tags, as shown in Fig. 14, or may be slit and sheared to form tag gangs of differing numbers connected at top and bottom, as shown in Fig. 19, the particular operation of the shearing mechanism to sever or slit the web X and the number of tags in the gangs aforesaid being predetermined by adjustments of said mechanism, as follows: As shown in Fig. 6, O is the oscillatory shear-blade, fulcrumed at $o$ upon the shear-frame O', upon which is fixed the ledger-blade $O^\times$. The cam P, fixed upon the shaft B, engages the roller $p'$ upon the pitman P', and the latter is provided at its opposite extremity with a yoke $P^\times$, pivoted to the shear-blade O at $p$, said blade being thereby oscillated upon its fulcrum $o$ once during each revolution of the shaft B and cam P. When it is desired to sever the web X by the stroke of the blade O, it is necessary that the overlap of said blades O and $O^\times$ shall be coextensive with or exceed the width of the web X fed between them by the rollers $M^9$ $M^{10}$. When, however, it is desired to merely slit said web in the formation of tag-gangs, the overlap must be adjusted to equal the length of the slit desired. In order that said blade O may be adjustably shifted with respect to the blade $O^\times$ with a resulting increase or diminution in the length of said overlap, the extremity of said pitman P' comprises a pivoted sector $P^2$, which is clamped in adjusted position with respect to said pitman by means of the set-screw $p^2$.

To permit of the adjustment of the shears and frame O' toward and from the notching mechanism in accordance with the aforesaid adjustment of the latter for differing widths of tags, the yoke $P^\times$ is mounted in the slideway $P^3$ upon said sector $P^2$, being secured thereon by the set-screw $p^\times$, the frame O' being adjustably mounted upon the frame A, as follows: Referring to Figs. 1, 3, 4, 5, and 6, the vertical fixed member $A^3$ of the frame supports the frame member $A^4$, which is vertically adjustable thereon by means of the screw $A^5$, which is mounted for idle rotation in $A^4$, but in threaded engagement with the boss $A^6$ upon $A^3$, the screw $A^7$ serving to secure the parts $A^3$ and $A^4$ in adjusted position. The frame member $A^8$ is horizontally adjustable upon the member $A^4$ toward and from the notching mechanism, being secured in adjusted position by the set-screw $A^9$. It is obvious that by adjustment of the sector $P^2$ upon the pitman P' and of the yoke $P^\times$ and the frame $A^8$ the shears may be set to operate in any desired position with respect to the web X. However, to effect the double operation of slitting and severing said web necessary in the production of tag gangs the shear-frame O' is mounted for vertical reciprocation upon the frame member $A^8$, upon which it is automatically raised and lowered by the cam $Q^\times$ and the opposed spring $O^2$. The cam $Q^\times$ is fixed upon the shaft Q, mounted for rotation in the brackets $a^4$ of the frame member $A^4$, and opposed to said cam is a friction-roller $o'$, journaled in the shear-frame O', the latter being slotted, as indicated at $o^2$, to permit of the vertical movement of said frame with respect to the shaft Q. The spring $O^2$, connecting the frame $A^4$ with the frame O', serves to uplift the latter to the limit of the slot $o^2$, when the roller $o'$ is freed from engagement with the cam $Q^\times$.

When it is desired to set the shearing mechanism to form tag gangs, the shear-frame O', being maintained in its upper position, the frame $A^4$ is adjusted vertically until the lower corner of the blade O is at the desired point in the tag-body web above the lower edge thereof. The sector $P^2$ is then shifted to effect the desired extent of overlap of the blade O upon the blade $O^\times$. The successive strokes of the shear-blade O when thus adjusted will produce a series of slits in the web X without severing the latter until the shear-frame O' is thrust bodily downward by the revolution of the cam $Q^\times$, whereupon the lower corner of the blade O is carried below the edge of the web X, and the changed relation of the parts increasing the overlap of the shears the web is thereby completely severed. The number of tag-slits in a gang is therefore dependent upon the sequence of revolution of the cam $Q^\times$ and shaft Q with respect to the cam P and shaft B, which is predetermined and adjusted as follows: Referring to Figs. 1, 4, 5, 6, and 12, the crank-arm R is fixed upon the shaft B and provided with an eccentric-stud R', adjustably mounted in the slideway $r$, upon which is journaled one extremity of the rack-pitman $R^2$, which is yoked at the other extremity in engagement with the gear-wheel $R^3$, fixed upon the pawl-disk $R^4$. Said yoke and disk are loosely mounted upon the shaft Q, and, as shown in Fig. 12, the pawl $r^4$ engages the ratchet-wheel Q', fixed upon said shaft. The stud R' may be radially adjusted in the slideway $r$ so that said pawl $r^4$ is caused to shift the ratchet-wheel Q', shaft Q, and cam $Q^\times$ the extent of any aliquot number of teeth $q'$. For instance, the number of said teeth illustrated being twelve, the stud R' may be set, as indicated in Fig. 6, to shift said ratchet and cam the extent of two teeth at each revolution of the shaft B and slitting stroke of the shear-blade O, so that upon the sixth stroke of the latter the cam $Q^\times$ will have made a complete revolution. The shear-frame Q' being thereby depressed, said stroke of the shear-blade O will completely sever the web, producing a tag gang, such as shown in Fig. 19. The stud R' may be similarly adjusted to increased eccentricity to produce gangs of four, three, and two tags, respectively. When, however, it is desired to completely sever the web X at each stroke of the shear-blade O, the stud R' is shifted to concentric relation with the shaft B, as indicated in Fig. 4, and the cam $Q^\times$ being in the position shown in Fig. 6 the shear-frame O' remains stationary and the parts just described are out of operation.

Referring to Figs. 1 and 4, S is a delivery-chute provided with guides $s\ s'$, conveniently adjustable to receive the tags or gangs severed from the web X, the bracket extension T upon the blade O serving to facilitate the delivery of the tags upon said chute.

To facilitate the counting of the tags or gangs produced, the shaft $m'$ is provided with a crank-arm U, connected by the link U' with the pawl-lever $U^2$. The pawl $u^2$ upon the latter engages the ratchet-wheel $U^3$, fixed upon the shaft $U^4$, and the striker $u^\times$ upon said shaft serves to operate the bell $U^\times$ at intervals determined by the relation of the parts.

It is obvious that various modifications may be made without departing from the spirit of my invention. I therefore do not desire to limit myself to the precise construction which I have shown and described.

I claim—

1. The combination with means to progress a tag-body web, of mechanism to notch the edge of said web at regular intervals, and means to adjust said mechanism with respect to said web, to vary the dimensions of the notches therein, substantially as set forth.

2. The combination with means to progress a tag-body web, of mechanism to notch the edge of said web at regular intervals, and a wedge-block to adjust said mechanism with respect to said web, to vary the dimensions of the notches therein, substantially as set forth.

3. The combination with means to progress a tag-body web, of an oscillatory blade to slit said web, and means to adjust the relative position of the center of oscillation of said blade and the edge of said web, to vary the dimensions of the slits in said web, substantially as set forth.

4. The combination with a reservoir for an adhesive compound, of a port leading from said reservoir, means to progress a strip of fabric, and a roller opposed to said port to present said strip against the mouth thereof, to receive the adhesive directly therefrom, substantially as set forth.

5. The combination with means to progress a tag-body web, of mechanism to notch the edge of said web at regular intervals, means to adjust said mechanism with respect to said web, to vary the dimensions of the notches therein, and adjustable means to vary the distance between the successive notches in said web, substantially as set forth.

6. The combination with means to progress a tag-body web, of an oscillatory blade to slit said web, means to adjust the relative position of the center of oscillation of said blade and the edge of said web, to vary the dimensions of the slits in said web, and adjustable means to vary the distance between the successive slits in said web, substantially as set forth.

7. The combination with means to progress a tag-body web, of an oscillatory blade to slit said web, means to automatically vary the relative position of the center of oscillation of said blade, and the edge of said web, to vary the dimensions of the slits in said web, at predetermined periods in the operation, substantially as set forth.

8. The combination with means to intermittently progress a tag-body web, of means to perforate said web during the intermission in its traverse, mechanism to notch the edge of said web, at regular intervals, and means to simultaneously adjust said notching mechanism vertically and in the direction of traverse of the web, to vary the dimensions of the notches and the distance of the same from the perforations, substantially as set forth.

9. The combination with a reservoir for an adhesive compound, of two ports leading from said reservoir, two strips of fabric, respective rollers arranged to present the respective strips in opposition to the respective ports to receive the adhesive, directly therefrom, and means to simultaneously progress both of said strips, substantially as set forth.

10. The combination with the feed-rollers $M^9$, $M^{10}$, of the gears $m^9$, $m^{10}$, fixed upon the respective rollers, the shaft $M^8$, extending from the roller $M^9$, the bevel-gear $m^6$, connecting said shaft $M^8$, with the shaft $M^6$, a ratchet-wheel $M^7$, fixed upon said shaft $M^6$, the pawl $m^5$, mounted to oscillate with respect to said shaft $M^6$, a pitman $M^3$, arranged to intermittently actuate said pawl $m^5$, an eccentric operatively connected with said pitman, and means to adjustably vary the throw of said eccentric, substantially as set forth.

11. The combination with means to progress a tag-body web, of mechanism to perforate said web at regular intervals, mechanism to notch the edge of said web at regular intervals, means to adjust said notching mechanism with respect to said web, to vary the dimensions of the notches therein, and mechanism arranged to operate in synchronism with said perforating and notching mechanism to provide said web with imprints in predetermined relation with said perforations and notches, substantially as set forth.

12. The combination with means to progress a tag-body web, of mechanism to notch the edge of said web at regular intervals, means to adjust said notching mechanism with respect to said web, to vary the dimensions of the notches therein, a blade arranged to slit said web, and mechanism arranged to operate in synchronism with said notching and slitting mechanism, to provide said web with imprints in predetermined relation with said perforations and slits, substantially as set forth.

13. The combination with means to progress a tag-body web, of means to progress reinforcing-strips upon opposite sides of said web, of perforating mechanism comprising opposed die-plungers K', $K^2$, the reciprocatory head $K^3$, in which said plunger K', is fixedly mounted, the reciprocatory head $K^4$, in which said plunger $K^2$, is mounted to reciprocate in the direction of its length, resilient means independent of the reciprocating mechanism to normally thrust said plunger $K^2$, forward with respect to said head $K^4$, a die-stem $k^2$, fixed in said head $K^4$, and extending through said plunger $K^2$, a passage-way $k'$, in the plunger $K'$, in registry with said die-stem $k^2$, and means to reciprocate said heads $K^3$, $K^4$, in opposition, substantially as set forth.

GEORGE W. SWIFT, Jr.

Witnesses:
ARTHUR E. PAIGE,
GEO. P. MCARTHUR.